United States Patent Office 3,435,098
Patented Mar. 25, 1969

3,435,098
RESIN COMPOSITION OF A VINYL CHLORIDE POLYMER BLENDED WITH AN ETHYLENE-VINYL CHLORIDE COPOLYMER
Hiroshi Watanabe, Kamakura, Masami Ozaki, Odawara, and Junji Hara, Yokohama, Japan, assignors to Toyo Koatsu Industries, Incorporated, Tokyo, Japan, a corporation of Japan
No Drawing. Continuation of application Ser. No. 437,564, Mar. 5, 1965. This application Mar. 27, 1968, Ser. No. 716,665
Claims priority, application Japan, Mar. 9, 1964, 39/12,782
Int. Cl. C08f *37/18, 29/04*
U.S. Cl. 260—897        12 Claims

ABSTRACT OF THE DISCLOSURE

Rigid and semi-rigid vinyl chloride polymer composition comprising a blend of a vinyl chloride polymer with from 6 to 80% by weight of the blend of an ethylene-vinyl chloride polymer having a combined ethylene content of less than 16% by weight of said ethylene-vinyl chloride polymer.

---

This is a continuation of Ser. No. 437,564 filed May 5, 1965, now abandoned.

This invention relates to polymer compositions having improved properties. More particularly, the present invention relates to rigid or semi-rigid vinyl chloride polymer compositions comprising a vinyl chloride polymer and an ethylene-vinyl chloride copolymer having a combined ethylene content of less than about 16% by weight.

The term "vinyl chloride polymer" as used herein means a vinyl chloride homopolymer or a vinyl chloride copolymer having vinyl chloride as a main constituent (for example, containing more than about 85% by weight vinyl chloride) copolymerized with an ethylenically unsaturated monomer copolymerizable with vinyl chloride and having an ethylenically unsaturated group, $>C=C<$, having no more than three hydrogen atoms attached to the carbon atoms thereof. Vinyl chloride polymers are so high in flame-resistance, tensile strength and hardness that they are used in large amounts for pipes, plates and the like. However, such vinyl chloride polymers are so brittle that they are not adapted to such uses as are subjected to impacts. At low temperatures, this defect is especially pronounced.

Further, the temperature at which vinyl chloride polymer begins to flow and the temperature at which the heat degradation becomes violent are so close to each other that it is difficult or impossible to apply certain processing operations thereto. For example, it is difficult to smoothly carry out such processing operations as extrusion of films and sheets through a flat-die, blow-molding and injection molding. If a plasticizer is added to the vinyl chloride polymer, the processing qualities of the polymer will be improved. But, when the amount of plasticizer added is small, that is, when a rigid or semi-rigid plasticized vinyl chloride polymer is desired, the impact strength is reduced to so low a value that the practical value of the plasticized polymer drops. Further, if the amount of added plasticizer is further increased, the softening temperature is reduced to so low a value that mechanical strength is lost and the polymer becomes soft and rubbery. Moreover, when such plasticizers are used, there result such undesirable phenomena as the volatilization, migration and solvent-extraction of the plasticizer during use of products made from the polymer. The vinyl chloride polymer has the further defect in that, when no plasticizer is mixed in, the tensile elongation of the polymer will be so low that the polymer is subject to cracking when it is bent or elongated.

In order to improve the impact strength of vinyl chloride polymers, there has been industrially adopted a method wherein rubber or a toughened polymer (for example, an acrylonitrile-butadiene-styrene resin) containing a rubber composition or a chlorinated polyethylene is blended with the vinyl chloride polymer. When such rubber or toughened polymer containing a rubber composition is blended, the processing qualities are not normally improved, transparency is lost and the resulting blend is subject to great deterioration, e.g., by oxidation of the parts containing an unsaturated bond in the rubber or toughened polymer containing a rubber composition blended with the vinyl chloride polymer. There are further defects in that, when a chlorinated polyethylene is blended, the blendability is not good, the processing qualities are not substantially improved and the transparency of the resulting product is lost.

As an attempt to improve the impact strength of a vinyl chloride polymer, U.S. Patent 3,112,290 discloses a method wherein an ethylene-vinyl chloride copolymer having a combined vinyl chloride content of necessarily less than about 80% by weight is blended with a vinyl chloride homoploymer or a copolymer of vinyl chloride with a small amount, for example, 5 to 15% by weight of other ethylenically unsaturated monomers copolymerizable therewith. However, in this method the compatibility between the ethylene-vinyl chloride copolymer and vinyl chloride polymer is less than desired, the blendability is not good, fish-eyes are likely to be produced during processing and the transparency of the resulting blends is low. As regards transparency, it is noted that said U.S. Patent 3,112,290 states that, when ethylene-vinyl chloride copolymers are employed in which the vinyl chloride is present in major amounts, the stated copolymers function as polymeric plasticizers for the polyvinyl chloride, and that such use of the stated copolymers as polymeric plasticizers results in clear, transparent, plasticized polyvinyl chloride composition. It has been found in practice that, even when the vinyl chloride content in the ethylene-vinyl chloride copolymer is as high as 80% by weight, the blend is only translucent and glass-like transparency is never obtained. In addition, the resulting rigid or semi-rigid product obtained has the defects that, unless a plasticizer is added to it, the tensile elongation is reduced to a much lower value than that of the vinyl chloride polymer itself and, when it is bent or elongated in practical use, it whitens remarkably and is subject to cracking.

An object of the present invention is to provide rigid or semi-rigid vinyl chloride polymer compositions which are greatly improved in impact strength, low temperature properties, processing qualities and tensile elongation as compared with polyvinyl chloride, are highly compatible and are high in transparency and very good in blendability.

The present invention relates to vinyl chloride polymer compositions prepared by blending (1) a vinyl chloride polymer which is a vinyl chloride homopolymer or a vinyl chloride copolymer containing less than about 15% by weight of an ethylenically unsaturated comonomer copolymerizable therewith and having an ethylenically unsaturated group, $>C=C<$, having no more than three hydrogen atoms attached to the carbon atoms thereof, with (2) an ethylene-vinyl chloride polymer having a combined ethylene content of less than about 16% by weight with or without monomer (which is copolymerizable with ethylene and vinyl chloride) in an amount of less than about 10% by weight of the ethylene-vinyl chloride polymer.

The vinyl chloride polymer to be used in the present invention means a vinyl chloride homopolymer or a copolymer of vinyl chloride with small amounts of the above-mentioned comonomer excepting ethylene. Such a vinyl chloride copolymer contains preferably less than about 15% by weight of a comonomer such as, for example, vinyl acetate, vinylidene chloride, isobutylene, etc. It is preferable from the viewpoint of the processing qualities and strength that the molecular weight of the vinyl chloride polymer used in the present invention be such that the value of the specific viscosity as measured by the method of A.S.T.M. D1243–58T, that is, at 30° C. as a solution of 0.4% nitro-benzene is about 0.18 to 0.60 or specifically 0.20 to 0.52.

The method of producing the vinyl chloride polymer used in the present invention is not specifically limited and can be by suspension-polymerization, emulsion-polymerization or bulk-polymerization. The polymer produced by the suspension-polymerization is preferable for the normal uses.

In a typical method of suspension polymerization, the polymerization is carried out at a polymerizating temperature of 30 to 70° C. or specifically 40 to 65° C. in water by using such dispersing agent as, for example, polyvinyl alcohol and such catalyst as an oil-soluble organic peroxy compound or azo compound, for example, lauroyl peroxide, tertiary butyl peroxy pivalate, isopropyl percarbonate or N,N-azobisisobutyronitrile.

In a typical method of emulsion-polymerization, the polymerization is carried out at a polymerizating temperature of 20 to 70° C. or specifically 40 to 65° C. in water by using such emulsifying agent as, for example, polyoxyethylene lauryl ether or sodium alkyl benzene sulfonate and a catalyst such as a water-soluble peroxy compound, for example, hydrogen peroxide or potassium persulfate.

In a typical method of bulk-polymerization, the polymerization is carried out at a polymerizing temperature of 30 to 70° C. or specifically 40 to 65° C. by using a catalyst such as an oil-soluble organic peroxy compound or azo compound, for example, lauroyl peroxide or N,N'-azobisisobutyronitrile.

The ethylene-vinyl chloride polymers used in the present invention include copolymers having a combined ethylene content of less than about 16% by total weight of the copolymer. Specifically a copolymer having a combined ethylene content of about 2 to about 15% by weight of the copolymer is generally preferable from the viewpoint of processing qualities and mechanical properties. The ethylene-vinyl chloride copolymer used can contain copolymerized therein, small amounts of other comonomers copolymerizable with ethylene and vinyl chloride. Typical of such comonomers are vinyl esters, e.g., vinyl acetate; vinyl ethers, e.g., butyl vinyl ether; derivatives of 1,2-ethylene dicarbonic acid, e.g., diethyl fumarate; allyl compounds, e.g., allyl alcohol or such olefins in which the number of carbon atoms in each molecule is at least 3, e.g., isobutylene. The content of such comonomers should be such as will not impair the properties of the ethylene-vinyl chloride copolymer and is usually less than about 10% by weight or preferably less than about 4% by weight of the ethylene-vinyl chloride copolymer. The most desirable is an ethylene-vinyl chloride polymer containing no such comonomer, that is, a copolymer composed only of ethylene and vinyl chloride. It is preferable from the viewpoint of the processing qualities and strength that the molecular weight of the ethylene-vinyl chloride polymer used in the present invention be such that the value of the specific viscosity as measured by the above-mentioned method of A.S.T.M D1243–58T is about 0.18 to 0.80 or specifically 0.20 to 0.60.

No ethylene-vinyl chloride copolymer in which the ethylene content exceeds about 16% by weight can be used in the present invention because, if the ethylene content in the ethylene-vinyl chloride copolymer exceeds about 16% by weight, its compatibility with the vinyl chloride polymer with which it is blended is significantly reduced, it is difficult to obtain a transparent product and to make a uniform blend, and the amount of improvement in impact strength is also sharply reduced. These changes are remarkably sharp, especially when the combined ethylene content in the ethylene-vinyl chloride copolymer exceeds about 18% by weight.

The method of producing the ethylene-vinyl chloride polymer is not specifically limited and can be any polymerizing method, such as, suspension-polymerization, emulsion-polymerization or bulk-polymerization.

In producing the ethylene-vinyl chloride polymer by the suspension-polymerization, it is typical to carry out the polymerization in water at a polymerizing temperature in a properly selected range of 10 to 65° C. or specifically 20 to 60° C. under a pressure of less than about 70 kg./cm.² by using a dispersing agent, for example polyvinyl alcohol, a catalyst such as a peroxy compound or azo compound, for example, hydrogen peroxide, isopropyl percarbonate, tertiary butyl peroxy pivalate or N,N'-azobisisobutyronitrile. There is also a method of carrying out the polymerization under the same reaction conditions as are mentioned above by using a combination of catalysts such as an organo boron compound, for example, triisobutyl boron with oxygen or a peroxy compound, for example, methyl ethyl ketone peroxide or hydrogen peroxide.

In producing the ethylene-vinyl chloride polymer by the emulsion-polymerization, it is typical to carry out the polymerization in water at a polymerizing temperature in a properly selected range of 10 to 65° C. or specifically 20 to 60° C. under a pressure of less than about 70 kg./cm.² by using as a catalyst such peroxy compound as, for example, hydrogen peroxide, potassium persulfate or tertiary butyl hydroperoxide with or without a reducing agent such as an organo boron compound, for example, tri n-butyl boron or sodium formaldehyde sulfoxylate.

In producing the ethylene-vinyl chloride polymer by the bulk-polymerization, it is typical to carry out the polymerization at a polymerizing temperature in a properly selected range of 0 to 65° C. or specifically 20 to 60° C. under a pressure of less than about 70 kg./cm.² by using as a catalyst such peroxy compound or azo compound as isopropyl percarbonate or N,N'-azobisisobutyronitrile or using such organo boron compound as triisobutyl boron combined with oxygen or an oil-soluble peroxy compound.

In blending the ethylene-vinyl chloride polymer with the vinyl chloride polymer, the ratio of 6 to 80% by weight, or preferably specifically 8 to 40% by weight, of the ethylene-vinyl chloride polymer to the total weight of the blend of vinyl chloride polymer and ethylene-vinyl chloride polymer is remarkably effective in increasing the impact strength without reducing the softening temperature too much and is therefore most desirable. If the ratio of the ethylene-vinyl chloride copolymer is less than 6% by weight, the impact strength as compared with that of the vinyl chloride polymer is not greatly improved. When the ratio of the ethylene-vinyl chloride polymer exceeds 80% by weight of the blend, the synergistic effect of mixing and using the vinyl chloride polymer and ethylene-vinyl chloride polymer is small, the blendability is a little lower and fish-eyes are likely to be produced.

The method of mixing the xinyl chloride polymer and the ethylene-vinyl chloride polymer with each other in the present invention is not specifically limited. There are available, for example, the method wherein the respective powders of both are mixed together and the method wherein the respective emulsion of both are mixed together and are dried. There is also the method wherein, in the presence of one polymer, the other polymer is produced or, for example, the polymerization is carried out by adding a vinyl chloride monomer and such catalyst as, for example, lauroyl peroxide, to the ethylene-vinyl chloride polymer to be used in the present invention. It is thought that, in such case, the vinyl chloride homopolymer and the ethylene-vinyl chloride polymer may be present partly as chemically combined but will be present mostly as a mechanical blend not chemically combined with each other. No substantial difference in the properties is seen between the mixture produced by such method and the mixture produced by mixing the respectively separately produced vinyl chloride polymer and ethylene-vinyl chloride polymer.

The thus-obtained mixture or blend of the polymers can be easily uniformly melted and kneaded by a kneading method normally used in working thermoplastic polymer compositions. The melting and kneading temperature is usually about 140 to 190° C. In the present invention, blends of two or more vinyl chloride polymers and two or more ethylene-vinyl chloride polymers also can be used.

It is possible to modify the vinyl chloride polymer compositions of the present invention so as to have properties corresponding to the desired end uses by adding as blending agents any one or more of such stabilizers as dibutyl tin maleate, cadmium laurate, calcium stearate or tribasic lead sulfate; such lubricants as stearyl alcohol or stearyl amide; such fillers as asbestos or calcium carbonate; such coloring agents as phthalocyanine blue or cadmium yellow; such plasticizers as di-n-octyl phthalate or di 2-ethyl hexyl adipate; such polymers as ethylene-vinyl acetate copolymers or acrylonitrile-butadiene copolymers or any other suitable additive.

If a conventional plasticizer is added as a blending agent, not only is the softening temperature reduced but also the mechanical strength is badly affected. Therefore, it is desirable for normal end uses that no added plasticizer be used. If it is to be used, however, it should be restricted to such amounts that the softening temperature of the resulting composition is not lower than about 40° C. or preferably may not be lower than about 52° C. The softening temperature so called in the present invention means a temperature at $G=3.17\times 10^3$ kg./cm.$^2$ obtained by the method of A.S.T.M.-D-1043-51 (that is, the value by the Clash and Berg method).

The impact strength, low temperature properties, processing qualities and tensile elongation of the vinyl chloride polymer compositions of the present invention are greatly improved as compared with those of the vinyl chloride polymer. Furthermore, the compatibility of the ethylene-vinyl chloride polymer used with the vinyl chloride polymer in said compositions is so good that the transparency is very high, the whitening in the case of bending or elongation is little, the mixing is very easy and fish-eyes are not produced to any substantial extent in processing. The softening temperature of the vinyl chloride polymer compositions of the present invention is higher than room temperature and is normally higher than 40° C. Therefore, the vinyl chloride polymer compositions of the present invention are rigid or semi-rigid. Such rigid or semi-rigid vinyl chloride polymer compositions high in all of the impact strength, low temperature properties, processing characteristics, tensile elongation and compatibility have not been known before and their practical value is very high.

The practicability of the present invention shall be described hereinafter. One of the most practical features of the vinyl chloride polymer compositions of the present invention is that their impact strength is much higher than that of the vinyl chloride polymer itself. Specifically remarkable is the fact that, when measured by the Izod impact testing method (A.S.T.M.-D-256), the impact strength of the vinyl chloride polymer composition of the present invention is of substantially the same value as that of an ordinary vinyl chloride polymer and is seen to be improved but that, when measured by the tensile impact measuring method (A.S.T.M.-D-1822-61T), as shown in the examples, its impact strength is greatly increased as compared with that of the vinyl chloride polymer. In this respect, it has come to be recognized today by polymer experts that the impact strength by the Izod impact testing method does not coincide with the true impact strength and that the impact strength by the tensile impact measuring method better coincides with the practical impact strength. These conclusions are well recognized and are shown, for example, on pages 199 to 206 of Modern Plastics, June 1956, published by McGraw-Hill, Inc., U.S.A. and page 149 of the April 1956 issue wherein it was stated: "It was soon realized that any but the crudest correspondence between the results of this test (Izod) and the actual performance in the field of plastic materials under impact loads was purely coincidental."

It is a fact to be noted that, though the impact strength of a test specimen of the polymer composition of this invention as measured by the Izod impact testing method is the same as that of a test specimen of the vinyl chloride polymer, the actual impact strength as measured by the impact strength by the above-mentioned tensile impact measuring method is much higher than of the vinyl chloride polymer.

Furthermore, it has come to be known today that generally, in order to improve the impact strength of a transparent, rigid and brittle resin, it is good to blend with the resin a tough polymer which is miscible but not compatible with such resin and that, in such case, generally, the transparency of the obtained resin composition will be lost and a whitening phenomenon will occur in bent or elongated parts thereof. It is recognized by the experts that, if a tough polymer which is perfectly compatible with such resin is used as blended with the resin, the obtained resin composition will lose no transparency and will cause no whitening phenomenon in bent or elongated parts thereof but will show substantially no effect in increasing the impact strength and it is usually very difficult, if not impossible, to improve the impact strength without impairing the transparency and the property of not whitening when bent or elongated. This is described, for example, on pages 549 to 556 of British Plastics, December 1959 (published by Iliffe Industrial Publications Ltd., England). In fact, an already known method of improving the impact strength of vinyl chloride polymers is to blend them with an acrylonitrile-butadiene-styrene resin or chlorinated polyethylene as mentioned above. However, the resin composition obtained by such method has no transparency and will whiten when bent or elongated. In the case of an ethylene-vinyl chloride copolymer of a vinyl chloride content of less than about 80% by weight is blended in exactly the same manner as described in said U.S. Patent 3,112,290, the transparency is lost and the product whitens when bent or elongated. It it shown that such copolymer has the common properties of a tough polymer which is miscible but not compatible.

On the other hand, it is seen that a polymer composition obtained by blending with a vinyl chloride polymer an ethylene-vinyl chloride polymer in which the vinyl chloride content is high and the ethylene content is lower than about 16% by weight as in the present invention maintains a glass-like transparency, will not whiten when bent or elongated and is perfectly compatible. Its impact strength is also greatly improved. Thus, the present invention has successfully solved the conventional difficulties and its practical significance is very important.

Thus, it is evident that, between the method and compositions of said U.S. Patent 3,112,290 and the method and compositions of the present invention, there is a distinctive difference in kind.

Further, it is to be noted in comparison with the present invention that, if any other rigid or semi-rigid vinyl chloride copolymer containing no ethylene is mixed in a vinyl chloride homopolymer, no blend satisfactory in every respect, for example, in all of the impact strength, low temperature properties and transparency will be obtained and such excellent results as are obtained in the present invention will not be produced.

In addition, our vinyl chloride resin compositions are excellent in low temperature properties as shown by the fact that the brittleness temperature is very much lower than that of the vinyl chloride polymer.

The temperature at which our vinyl chloride polymer compositions begin to flow is lower than of the vinyl chloride polymer. Therefore, the processing qualities are also improved. As an additional feature, the elongation at the properly elevated temperature of our vinyl chloride polymer compositions is very much larger than that of the vinyl chloride polymer itself. Their thermoforming characteristics, for example, vacuum-forming characteristics and the stretchability of the films made therefrom are very high. Our vinyl chloride polymer compositions are so high in the tensile elongation that they have no tendency to whiten, crack or break when bent or elongated and thus are high in folding endurance. The vinyl chloride polymer compositions are also so high in compatibility that the transparency is very high and they can be easily melted and mixed and fish-eyes are very seldom produced. Therefore, the vinyl chloride polymer compositions of the present invention have the advantage that they can be easily processed into any desirable extruded product by dry blend extrusion methods.

The vinyl chloride polymer compositions of the present invention thus have so many excellent properties that they are very well adapted to such uses as, for example, extrusion and the production of pipes, plates, films, stretched films, blow-molded bottles and articles, vacuum-formed vessels and articles and injection-molded articles.

The present invention is illustrated with reference to the following specific examples in which the polymers used were all prepared by a suspension-polymerizing method and the specific viscosity values mentioned were determined by the method of A.S.T.M. D1243–58T and which are not intended to limit the scope of the present invention in any way.

EXAMPLE 1

Two parts by weight of dibutyl tin maleate (of a trade name of TVS #MA-300) produced and sold by Nitto Chemical Company, Ltd., Japan, as a heat stabilizer and 0.5 part by weight of stearyl alcohol as a lubricant for each sample were added to 100 parts by weight of a total of a vinyl chloride homopolymer having (when used) a specific viscosity of 0.38 and an ethylene-vinyl chloride polymer having a combined ethylene content of 14.8% by weight, a combined vinyl chloride content of 85.2% by weight and a specific viscosity of 0.38 set forth in Table 1 at each of proportions in parts by weight set forth under A, B, C, D and E in Table 1. Each resulting mixture was subjected to a property test (I) and a fish-eye comparison test (II) as described hereinafter.

(I) Property test.

Sheets were obtained by separately mixing and kneading each above-mentioned mixture with mixing rolls of 8 inches by 16 inches at 160° C. for five minutes, were then cooled to room temperature and peeled off the rolls. The sheets were cut into the shape of the mold in which the compression molded specimens were to be made. The samples were preheated at the mold temperature of 180° C. for 2 minutes at a hydraulic pressure of about 4 kg./cm.$^2$ by means of 20 ton press and were then pressed under a pressure of 100 kg./cm.$^2$ for 5 minutes. They were then cooled to room temperature. Then respective test pieces (corresponding to the numbers A, B, C, D and E) required to carry out the following tests were cut off and were used in the tests:

(1) The tensile strength and the tensile elongation were measured at a drawing velocity of 50 mm. per minute in accordance with the method of A.S.T.M.-D-638.

(2) The tensile impact strength was measured in accordance with A.S.T.M.-D-1822-61T and the impact strength (½ x ⅛ inch notched bar) was measured by the Izod impact testing method in according with A.S.T.M.-D-256.

(3) The brittleness temperature was measured in accordance with the method of A.S.T.M.-D-746.

(4) The temperature when $G=3.17 \times 10^3$ kg./cm.$^2$ by the method of A.S.T.M.-D-1043-51 (that is, the Clash and Berg method) was taken as the softening temperature.

(5) The total transmission was measured by using a test piece 4 mm. thick in accordance with A.S.T.M.-D-1003-52 to determine transparency.

(6) In the bending test a test piece 0.8 mm. thick was once bent by an angle of 180 degrees, was then bent back by an angle of 360 degrees in the other direction and was then returned to the original plane state and the bent part was observed.

(7) Comparison of the processing quality. The flow beginning temperature was determined by using a constant velocity (rate) temperature elevating method at a temperature rising velocity (rate) of 3° per minute under a pressure of 30 kg./cm.$^2$ with a nozzle diameter of 1 mm. and a nozzle length of 1 mm. with Koka Flow Tester made by Shimazu Manufactory, Ltd., Japan.

(II) Fish-eye comparison test (by the dry blend extrusion method).

The above-mentioned mixture was put into a Henschel mixer of a capacity of 150 liters made by Miike Manufactory, Ltd., Japan, and was mixed for 15 minutes. The thus obtained mixture was cooled down to the room temperature and was then formed into films of an average thickness of 0.03 mm., in a blow extrusion film molding apparatus having an extruder bore diameter of 40 mm., a compression ratio of 3.2, a ratio of the cylinder length to the cylinder bore of 22:1, a round die diameter of 80 mm. and a die clearance of 0.7 mm., under the conditions of a number of revolutions of the screw at 40 r.p.m., a rear cylinder temperature of 150° C., a front cylinder temperature of 190° C., a die temperature of 190° C. and a blow-up ratio of 2. Ten pieces of film of a size of 5 x 5 cm. were taken at random out of the obtained films and the number of fish-eyes in each of the films was counted with the naked eyes and averaged. The results of the above tests are collectively mentioned in Table 1.

TABLE 1

| Number | A* | B† | C† | D† | E* |
|---|---|---|---|---|---|
| Blending ratio: | | | | | |
| Vinyl chloride homopolymer | 100 | 90 | 80 | 60 | 0 |
| Ethylene-vinyl chloride copolymer | 0 | 10 | 20 | 40 | 100 |
| Properties: | | | | | |
| Tensile strength in kg./cm.$^2$ | 550 | 620 | 600 | 570 | 450 |
| Tensile elongation (percent at break) | 3 | 32 | 46 | 95 | 320 |
| Impact strength by ASTM-D-1822-61T in kg.-cm./cm.$^2$ | 50 | 110 | 136 | 136 | 130 |
| ASTM-D-256 in ft.-lb./in of notch | 0.85 | 0.85 | 0.86 | 0.86 | 0.86 |
| Brittleness temperature in ° C | −14 | −25 | −29 | −39 | −44 |
| Softening temperature in ° C | 73 | 71 | 66 | 57 | 30 |
| Transparency in percent of total transmission | 86 | 86 | 87 | 87 | 87 |
| Bending test | (¹) | No change | | | |
| Flow beginning temperature in ° C | 180 | 174 | 168 | 138 | 121 |
| Fish-eyes Comparison: Average number of fish-eyes | (²) | 2 or less | 3.2 | | 2 or less |

¹ Fine cracks were produced.
² Difficult to process due to decomposition.
Remarks: *Comparative example.  † Present invention.

It is clear from the test results mentioned in Table 1 that the tensile strength of the polymer compositions of the present invention are not so different from that of the vinyl chloride homopolymer but that their tensile elongation is greately increased, that their low temperature property is improved (their brittleness temperature is reduced), that their processing characteristics are improved (their flow beginning temperature is reduced), that their transparency is high, that they do not change in the bending test and that their softening temperature is somewhat reduced as compared to the homopolymer. Further, it is clear that, though their impact strength in the Izod impact testing method is not substantially different from that of the comparative vinyl chloride homopolymer, their tensile impact strength is greatly improved.

The measured values of tensile impact strength on numbers B, C and D of Table 1 are much higher than the theoretical values calculated by a proportionating calculation using the values of the tensile impact strength of the numbers A and E as shown in Table 2. It is, thus, clear that the desirable synergistic effect by the blending of the vinyl chloride polymer and ethylene-vinyl chloride copolymer is shown to be high.

TABLE 2

| Number | A | B | C | D | E |
|---|---|---|---|---|---|
| Theoretical value in kg.-cm./cm.² | (50) | 58 | 66 | 82 | (130) |
| Measured value in kg.-cm./cm.² | 50 | 110 | 136 | 136 | 130 |
| Difference between the measured value and theoretical value in kg.-cm./cm.² | | 52 | 70 | 54 | |

Further, in comparing the polymer composition (each of the numbers B, C and D) of the present invention and the ethylene-vinyl chloride copolymer (the number E) with each other, it is found that the number E is somewhat higher in only one instance in impact strength, is much lower in softening temperature (non-rigid) and tensile strength and is therefore more disadvantageous in the normal uses than the numbers B, C and D corresponding to the present invention.

EXAMPLE 2

The same amounts of the same heat stabilizer and lubricant as in Example 1 were added respectively to mixtures (A through M) as set forth in Table 3 of 100 parts by weight of a total of a vinyl chloride polymer and an ethylene-vinyl chloride polymer as described in Table 3, when used, (with the addition, in one case, of di 2-ethyl hexyl adipate as a plasticizer), at the ratios set forth in Table 3. Exactly in the same manner as in Example 1, respective sheets and test pieces were made from each mixture and the tensile strength, tensile elongation, tensile impact strength, brittleness temperature, transparency, bending and flow beginning temperature were measured. Also, in the same manner as in Example 1, fish-eyes comparison tests were carried out. The respective results of these measurements and tests are also set forth in Table 3.

their compatibility will be so low that no transparent resin composition results, the impact strength is not nearly improved to the same extent and fish-eyes in large quantities are produced. It is also found from the results of the numbers D and E in Table 3 that the impact strength of both is very high and when an ethylene-vinyl chloride polymer of an ethylene content close to 16% by weight is used, if the blending amount of the ethylene-vinyl chloride polymer is low, there will be no problem but, if it is high, the transparency will be slightly reduced and some increase in fish-eyes will occur.

What is claimed is:

1. A polymer composition comprising a blend of from 20 to 94% by weight of the blend of vinyl chloride polymer selected from the group consisting of vinyl chloride homopolymer and vinyl chloride copolymer containing less than about 15% by weight of ethylenically unsaturated comonomer copolymerizable therewith, said comonomer containing a group $>C=C<$ having not more than 3 hydrogen atoms attached to the carbon atoms thereof and from 6 to 80% by weight of the blend of ethylene-vinyl chloride polymer containing ethylene in an amount of 2 to 15% by weight of said ethylene-vinyl chloride polymer.

2. The composition according to claim 1 wherein the ethylene-vinyl chloride polymer consists of ethylene and vinyl chloride.

3. The composition according to claim 2 wherein the vinyl chloride polymer is vinyl chloride homopolymer.

4. The composition according to claim 2 wherein the vinyl chloride polymer is vinyl chloride-vinyl acetate copolymer.

5. The composition according to claim 1 wherein the amount of ethylene-vinyl chloride copolymer is 8 to 40% of the total weight of the blend.

6. The composition according to claim 1 wherein the specific viscosity according to the method of A.S.T.M. D1243–58T of vinyl chloride polymer is 0.18 to 0.60 and that of ethylene-vinyl chloride polymer is 0.18 to 0.80.

| Polymers | | | | | Number | | | | | | | | | | | |
|---|---|---|---|---|---|---|---|---|---|---|---|---|---|---|---|---|
| Name | Composition | | | Specific viscosity | A* | B† | C† | D† | E† | F* | G* | H† | I* | J† | K† | L† | M* |
| | Ethylene | Vinyl chloride | Vinyl acetate | | | | | | | | | | | | | | |
| Blending ratio: | | | | | | | | | | | | | | | | | |
| V₁ | | 100.0 | | 0.31 | 100 | 65 | 80 | 70 | 50 | 70 | 70 | 70 | | | 62 | 62 | 60 |
| V₂ | | 96.5 | 3.5 | 0.31 | | | | | | | | | 100 | 70 | 10 | | 40 |
| E₁ | 2.5 | 97.5 | | 0.33 | | 35 | | | | | | | | | | | |
| E₂ | 6.3 | 93.7 | | 0.28 | | | 20 | | | | | | | 30 | 20 | 35 | |
| E₃ | 15.7 | 84.3 | | 0.33 | | | | 20 | 30 | 50 | | | | | | 8 | |
| E₄ | 10.0 | 86.5 | 3.5 | 0.41 | | | | | | | | 30 | | | | | |
| E₅ | 18.8 | 81.2 | | 0.31 | | | | | | | 30 | | | | | | |
| E₆ | 25.0 | 75.0 | | 0.31 | | | | | | | | | | 30 | | | |
| DOA | | | | | | | | | | | | | | | | 3 | |
| Properties: | | | | | | | | | | | | | | | | | |
| Tensile strength, kg./cm.² | | | | | 550 | 590 | 620 | 590 | 540 | 580 | 520 | 590 | 580 | 560 | 600 | 590 | 600 |
| Tensile elongation (at break), percent | | | | | 3 | 20 | 34 | 65 | 164 | 43 | 2 | 59 | 4 | 36 | 37 | 48 | 4 |
| Tensile impact strength, kg.-cm./cm.² | | | | | 48 | 98 | 118 | 130 | 127 | 91 | 55 | 101 | 44 | 112 | 125 | 105 | 45 |
| Brittleness temperature, °C | | | | | −13 | −19 | −22 | −41 | −40 | −33 | −15 | −30 | −4 | −18 | −26 | −19 | −9 |
| Softening temperature, °C | | | | | 73 | 70 | 70 | 60 | 53 | 62 | 59 | 64 | 71 | 66 | 67 | 61 | 72 |
| Transparency (total transmission), percent | | | | | 86 | 87 | 87 | 86 | 80 | 66 | 45 | 86 | 88 | 88 | 86 | 88 | 86 |
| Bending test | | | | | (¹) | (²) | (²) | (²) | (²) | (³) | (²) | (²) | (¹) | (²) | (²) | (²) | (¹) |
| Flow beginning temperature, °C | | | | | 172 | 167 | 165 | 153 | 145 | 156 | 160 | 157 | 168 | 163 | 163 | 160 | 170 |
| Fish-eyes comparison: Average number of fish-eyes | | | | | (⁴) | (⁴) | (⁴) | 2.4 | 6.0 | (⁵) | (⁵) | (⁴) | (⁴) | (⁴) | (⁴) | (⁴) | (⁴) |

¹ Fine cracks were produced.  ² No particular change.  ³ The bent part whitened.  ⁴ 2 or less.  ⁵ Very many.
Remarks: *Comparative example.  †Present invention.
Note: In the above table, V₁ and V₂ stand for vinyl chloride polymers, E₁, E₂, E₃, E₄, E₅ and E₆ stand for ethylene-vinyl chloride copolymers and DOA stands for di 2-ethylhexyl adipate.

It is found from the results of the numbers F and G in Table 3 that, when an ethylene-vinyl chloride copolymer having an ethylene content higher than 16% and a vinyl chloride polymer are blended with each other, 7. The composition according to claim 6 wherein the specific viscosity according to the method of A.S.T.M. D1243–58T of vinyl chloride polymer is 0.20 to 0.52 and that of ethylene-vinyl chloride polymer is 0.20 to 0.60.

8. The composition according to claim 7 wherein the vinyl chloride polymer is selected from the class consisting of vinyl chloride homopolymer and vinyl chloride-vinyl acetate copolymer.

9. An article of manufacture processed from the composition of claim 1.

10. An extruded article of manufacture processed from the composition of claim 1.

11. A blow-molded article made from the composition of claim 1.

12. A film made from the composition of claim 1.

References Cited

UNITED STATES PATENTS 3,112,290  11/1963  Salyer _____ 260—455

MURRAY TILLMAN, *Primary Examiner.*

C. J. SECCURO, *Assistant Examiner.*

U.S. Cl. X.R.

260—23, 31.8, 32.6, 33.4, 41, 45.75, 889, 899